Aug. 25, 1959     T. R. SMITH     2,901,294
TUB SEAL AND BEARING STRUCTURE
Filed May 7, 1956     2 Sheets-Sheet 1

Inventor
Thomas R. Smith
by James S. Nettleton
Attorney

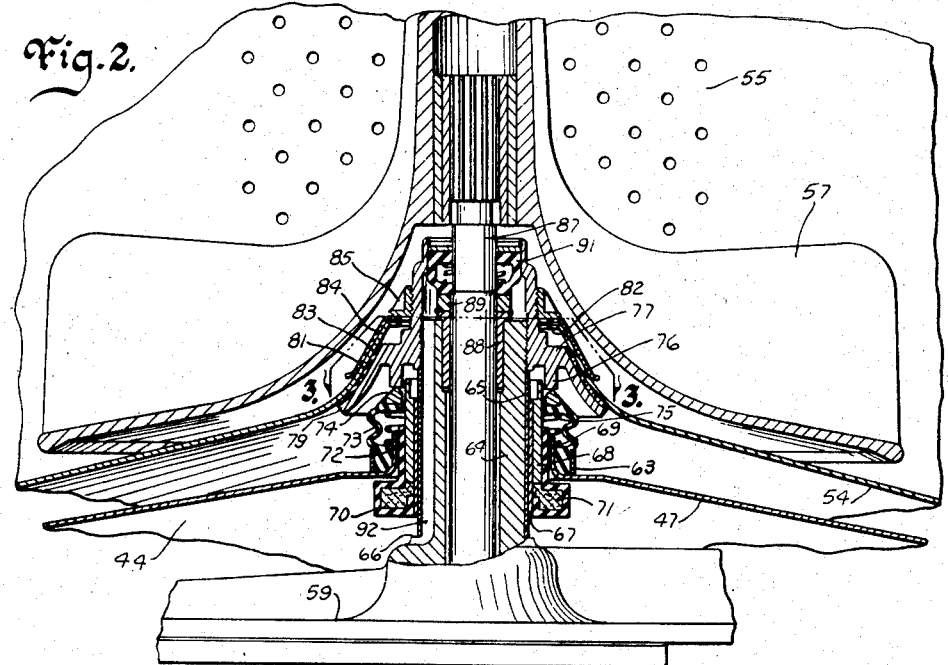
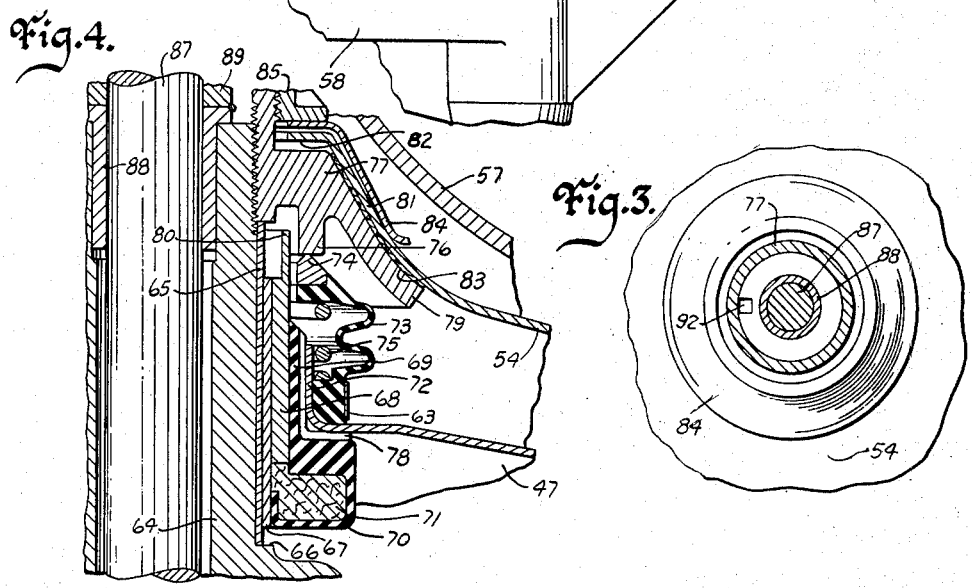
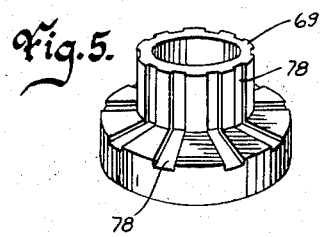
Inventor
Thomas R. Smith

United States Patent Office 2,901,294
Patented Aug. 25, 1959

2,901,294

TUB SEAL AND BEARING STRUCTURE

Thomas R. Smith, Newton, Iowa, assignor to The Maytag Company, Newton, Iowa, a corporation of Delaware Application May 7, 1956, Serial No. 583,176

6 Claims. (Cl. 308—36.1)

This invention relates generally to a vertical axis washing machine having a spin basket nested within a non-rotatable outer tub and rotated relative to that tub by a revoluble spin shaft entering the bottom of the tub through a resiliently mounted self-aligning bearing. This invention relates specifically to that latter tub bearing structure which is not only self-aligning with respect to the spin shaft journalled within the bearing but which is also provided with a novel oil reservoir and self-lubricating system as well as means for preventing water from the tub from entering the bearing proper.

In the accompanying drawings:

Figure 2 is an enlarged fragmentary vertical sectional view of the embodiment shown in Figure 1;

Figure 3 is a cross sectional view taken on line 3—3 of Figure 2;

Figure 4 is an enlarged fragmentary view of the tub bearing structure shown in Figure 2; and, Figure 5 is a perspective view of the resilient bearing mounting member for the outer tub.

Figure 1:
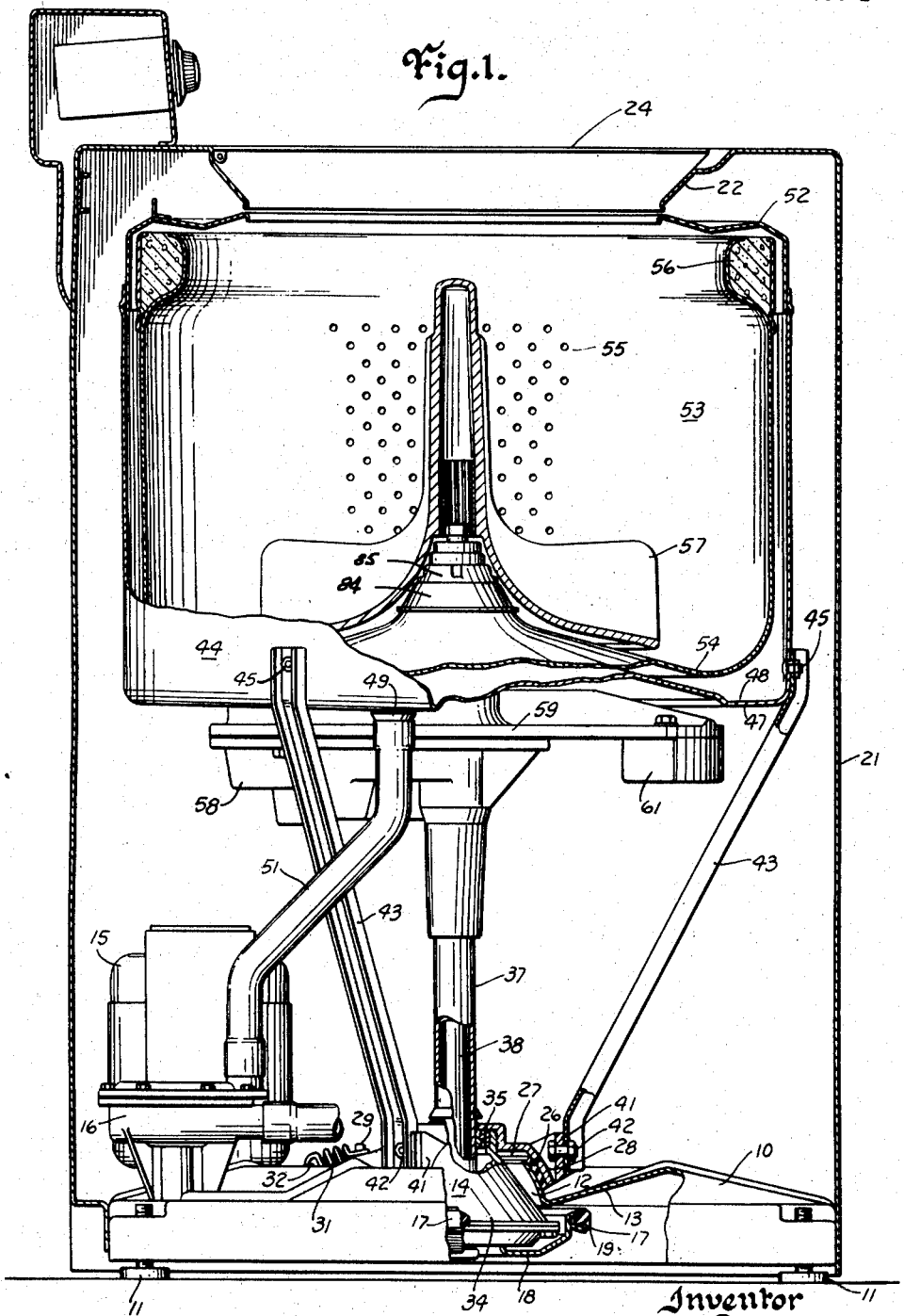
Figure 1 is a side elevation, partly broken away, showing a machine of the vertical axis type incorporating the preferred embodiment of my tub bearing construction.

In the accompanying drawings there is shown a base frame 10 mounted on adjustable feet 11 and provided with a supporting dome 12 rising out of a centrally located depression 13 in base frame 10. Dome 12 serves as a mounting for a drive assembly 14 such as that disclosed in the John D. Goodlaxson application, Serial No. 505,231, filed May 2, 1955, and assigned to the same assignee as that of the instant application.

Base frame member 10 also supports the up-ended reversible motor 15 and the water pump 16 which, like drive assembly 14, is driven by motor 15 through belt 17 on the under side of base frame 10. Numeral 19 designates the groove of pulley 18 which serves as the input member for the drive assembly 14.

Cabinet 21, attached to and enclosing base frame 10 together with the drive and tub assemblies supported thereby, is provided at its upper end with a depending annular flange 22 defining an access opening into the washing machine apparatus which is normally covered by access door 24.

In Figure 1 it can be seen that dome 12 in base frame 10 is provided with friction pads 26 at its periphery adjacent the opening 27 in its uppermost portion. An umbrella-like support member 28 rests on these friction pads 26 and is provided with three equally spaced ears 29 for three centering springs 31 which are fastened to brackets 32 connected to base frame 10. This arrangement centers support member 28 on dome 12 and restrains it from rotation relative to base frame 10.

Threaded into the umbrella support member 28 is a member 34 of substantially frusto-conical configuration which serves as a housing for drive assembly 14 of the previously identified Goodlaxson application Serial No. 505,231. Housing member 34 cooperates with umbrella support member 28 by gripping the outer race of a thrust bearing 35 which is provided with a tapered inner race. Mating with and seated in this tapered inner race of bearing 35 is the spin tube or shaft 37 which journals a power shaft 38 also extending into the drive assembly 14. With this construction all weight placed on the spin tube 37, housing 34 and on umbrella member 28 may be used to an advantage to provide ample frictional forces between umbrella member 28 and the friction pads 26 for dampening nutational movements of the shafts 37 and 38 relative to dome 12 while permitting rotational movement of spin tube 37 in thrust bearing 35.

While the details of the Goodlaxson assembly forming the basis for the previously identified application Serial No. 505,231 are not essential to the construction of the instant invention, its operation can be briefly explained for environmental purposes. Upon energization of motor 15 in a direction to rotate pulley 18 in a counterclockwise direction as viewed from the bottom of Figure 1, power shaft 38 is rotated in this same direction while spin shaft 37 is held against rotation by appropriate braking mechanism within housing 34. Upon the reversal of motor 15, spin shaft 37 is released for rotation to allow shafts 37 and 38 to be spun in unison in a clockwise direction.

With the drive and support construction set forth above, it can be seen that shafts 37 and 38 may be selectively rotated as determined by the direction of rotation imparted to pulley 18 while permitting their nutation about a vertical axis at all times. In the washing machine illustrated in the accompanying drawings, shafts 37 and 38 nutate on a point determined by the intersection of the vertical axis of rotation with a horizontal plane bisecting groove 19 of pulley 18.

Now with reference to the tub assembly, it will be noted that umbrella support member 28 is provided with three recessed upstanding lugs 41 spaced equally from each other and alternately around member 28 with respect to the three ears 29. While not entirely obvious from Figure 1, it will be apparent from this description that there are three lugs 41 spaced 60° from each other each of which is 30° removed from an adjacent ear 29.

Fastened within the recessed lugs 41 by connectors 42 are the three tub brace members 43 which are, in this embodiment, of channel-like cross section. Brace members 43 extend outwardly and upwardly from umbrella support member 28 to join the non-rotatable imperforate outer tub 44 through tub connectors 45 to form an inverted tripod support for tub 44. The tub 44 is provided with a bottom wall 47 in which is formed a C-shaped gutter 48 having its lowermost portion converging into the drain outlet 49 which in turn communicates with the water pump 16 through the flexible drain hose 51.

The non-rotatable outer tub 44 is provided with a removable crown 52 which permits removal of the rotatable inner clothes basket or receptacle 53 nested within tub 44. Clothes receptacle 53 has a perforate bottom wall 54 and a perforate cylindrical side wall 55 which carries a concrete inertia ring 56 at its uppermost end. A conventional oscillating type agitator 57 is mounted within the clothes receptacle 53 to provide the proper agitation of fabrics placed within the tub assembly thus formed.

In order to drive agitator 57 during the agitation cycle and inner spin basket or tub 53 during the fluid extraction cycle, the following connections to the drive assembly 14 are provided. Spin tube 37, extending into drive assembly 14, carries at its upper end the lower gear case cover 58 which in turn is bolted to the upper gear case cover 59 carrying counterweight 61 which balances the conventional motion converting unit housed by covers 58 and 59 and driven by power shaft 38.

In Figure 2 the upper gear case cover 59 is shown provided with a mounting stem 64 extending upwardly in a coaxial relationship to spin shaft 37 with which it forms a unitary extension. Mounting stem 64 carries a bearing spacer sleeve 65 which rotates with mounting stem 64 and has its lower end abutting shoulder 66 on the gear case cover 59. Rotation of mounting stem 64 produces a relative rotation between the spacer sleeve 65 and a sintered bronze bushing 67 which journals sleeve 65 and which is pressed into the self-aligning outer bearing sleeve 68 to which the resilient sleeve 69 is molded. The lower portion of resilient sleeve 69, which in practice has been of rubber, defines an oil reservoir 70 contiguously encircling bushing 67 and carrying wicking 71 in contact with the sintered bushing 67 to supply the latter member with lubricant at all times. Oil from reservoir 70 and wicking 71 is drawn into and permeates all of bushing 67 due to the capillary attraction existing between the oil and the porous bushing 67. This permits a constant lubrication of sleeve 65 without the necessity of frequent lubrication of that member.

The resilient sleeve 69 is held in its position by a squeeze fit maintained in the centrally located opening formed by the upstanding flange 72 in the bottom tub wall 47. This permits rapid assembly of these parts and allows the flexibly supported bearing structure to align itself with the mounting stem 64 during the rotational and slight lateral movements of stem 64 relative to tub 44.

Flange 72 in wall 47 is encircled by a boot seal 73 which has its lower end clamped around flange 72 by the large hose clamp 63 and its upper end provided with a carbon nose seal ring 74. Spring 75 within the boot seal 73 urges the nose ring 74 upwardly against a smooth sealing surface provided by the ring or annulus 76 depending from the flanged tub carrier member 77 which is threaded onto mounting stem 64 in abutting relationship to the upper end of the spacer sleeve 65. In this construction spacer sleeve 65 provides mounting stem 64 with a hardened bearing surface and regulates the spacing between members 64 and 77.

The sealing engagement between ring 74 and annulus 76 provides an air and water tight seal for the mounting stem 64 while permitting both rotational and slight lateral movements to take place between the inner tub 53 and the outer tub 44. In this illustrated machine nose ring 74 is not exposed to fluid contact due to the presence of air trapped in that region beneath tub wall 47 when tub 44 is filled with fluid. However, if this air lock is broken due to a defective seal, fluid seeping between sealing ring 74 and annulus 76 will flow downwardly through the drain passageways formed by the upstanding flange 72 and grooves 78 formed in the outer surface of the resilient sleeve 69 as apparent from Figures 4 and 5. In addition, should a defective seal produce seepage from tub 44, the lip 80 formed on sleeve 68 and extending upwardly beyond nose ring 74 will divert the seepage into grooves 78 to thereby prevent drainage into the bearing structure between sleeve 65 and bushing 67.

Referring now to the means for connecting the inner tub 53 to the mounting stem 64, it will be noted that the flange 79 of tub carrier 77 is substantially of frustoconical cross section with a slight radius being formed in its peripheral portion to form a non-linear taper and to provide a supporting seat for the inner tub 53. Tub 53 in turn is formed with an apertured re-entrant portion 81 located in the central portion of its bottom wall 54 and formed with substantially the same configuration as the tub mounting flange 79.

This re-entrant portion 81 is provided with centrally located inwardly directed horizontal flange 82 which strengthens the circular opening through which carrier 77 protrudes. Since, in actual construction of this tub assembly, inner tub 53 is porcelain enameled while carrier 77 is formed of aluminum, a cork gasket 83 is cemented on the periphery of flange 79 to provide a water-tight seal and to assure a more uniform unit loading between these parts. Gasket 83 also provides a better frictional engagement between carrier 77 and tub 53 to prevent relative movement between these parts during the operation of the machine incorporating this construction.

Clothes receptacle 53 is wedged against flange 79 as shown in Figures 2 and 4. Those figures show clamp washer 84 as having a flanged central apertured portion with a body tapered to produce a contour similar to that of re-entrant portion 81. The periphery of washer 84 defines a rolled edge which facilitates removal of washer 84 from tub 53 and prevents it gouging the surface of tub member 53 once the tub mounting is assembled.

The large nut 85 threaded on the upper portion of carrier 77 is tightened onto the latter member so as to transmit forces produced by such a tightening action through the centrally located horizontal flanged portion of washer 84 and then into re-entrant portion 81 through the tapered body portion of the washer 84. With nut 85 tightened against clamp washer 84 basket 53 becomes a unitary assembly with mounting stem 64 and spin shaft 37.

Now with reference to the drive to agitator 57, that agitator member is splined to the upper end of agitator shaft 87 which receives its rocking movements from the conventional motion converting unit housed between the gear housing covers 58 and 59 and driven by the power shaft 38. Agitator shaft 87 is journalled in bearing 88 which is seated in the recessed upper end of mounting stem 64. Collar 89, pinned to shaft 87, prevents downward movement of shaft 87 in an axial direction and serves as the reaction member for the spring urged shaft seal 91 located at the mouth of flanged carrier member 77. While this sealing arrangement effectively seals shaft 87 during operation of agitator 57, a longitudinal drain duct 92 is provided in the mounting stem 64 to permit seepage fluid to pass from tub 44 in case of deterioration or failure of seal 91.

It should be apparent that upon rotation of drive assembly pulley 18 by motor 15 in a counterclockwise direction as viewed from the bottom of Figure 1, spin shaft 37 will be braked by mechanism within assembly 14 while power shaft 38 will cause agitator shaft 87 to oscillate agitator 57 within tub 53 in a conventional manner. Upon reversal of motor 15, pulley 18 will drive shafts 37 and 38 in unison to extract fluids from damp fabrics within tub 53 by means of the connection existing between tub 53 and spin shaft 37.

It should also be apparent from the description that the type movement imparted to the shaft 87 journalled in mounting stem 64 is not critical to the concept of the tub seal and bearing structure forming this invention and that either oscillatory, rotary or reciprocating shafts may be used to accomplish the washing action desired within tub 53.

While I have herein described and upon the drawings shown the preferred embodiment of my invention, it is to be understood that the invention is not limited thereto, but may comprehend other constructions, arrangements of parts, details and features without departing from the spirit of the invention.

As to the aspects of the tub seal and bearing structure presented herein, this application constitutes a continuation-in-part of the Thomas R. Smith and Gerald W. Jones application, Serial No. 555,323, filed December 27, 1955 for Tub Mounting Assembly and assigned to the assignee of this invention.

I claim:

1. A bearing assembly comprising, a support member provided with a flanged opening therein, a revoluble shaft protruding through said opening, a porous bearing journalling said shaft, a sleeve member retaining said bearing in concentric relationship therewith, and means flexibly mounting said sleeve member in said flanged opening and defining an oil reservoir below said opening and said sleeve member and contiguously encircling said porous bearing.

2. A bearing assembly comprising, a support member provided with a flanged opening therein, a revoluble shaft protruding through said opening, a porous bearing journalling said shaft, a sleeve member retaining said bearing in concentric relationship therewith, means resiliently mounting said sleeve member in said flanged opening and defining an oil reservoir below said opening and said sleeve member and contiguously encircling said porous bearing, said means being bonded to said sleeve and retained within said opening by a squeeze fit therewith.

3. A bearing assembly comprising, a support member provided with a cylindrical flanged opening therein, a revoluble shaft protruding through said opening, a bearing member journalling said shaft, a sleeve member encompassing said bearing member in concentric relationship therewith, and means resiliently mounting said sleeve member in said opening in a squeeze fit and defining a lubricant reservoir below said opening and said sleeve member and contiguously encircling said bearing member and cooperating therewith to supply said bearing member with lubricant from said reservoir.

4. A bearing assembly comprising, a support member provided with a supporting cylindrical flanged opening therein, a revoluble shaft protruding through said opening, a bearing member journalling said shaft, a sleeve member encompassing said bearing member in concentric relationship therewith, and means resiliently mounting said sleeve member in said opening and defining a lubricant reservoir below said opening and said sleeve member and contiguously encircling said bearing member and cooperating therewith to supply said bearing member with lubricant from said reservoir, said means being bonded to said sleeve and retained within said opening by a squeeze fit therewith.

5. A shaft seal and bearing assembly comprising, a supporting wall provided with a flanged opening, revoluble shaft means extending through said opening and including a bearing surface lying in a plane intersecting the longitudinal axis of said shaft means, sealing means encircling said flange and abutting said bearing surface in a sliding contact to produce a watertight seal between said wall and said bearing surface during rotation of said shaft means, a porous bearing positioned within said opening and journalling said shaft means, a sleeve member retaining said bearing, and resilient means mounting said sleeve member in said flanged opening and defining an oil reservoir contiguously encircling said bearing, the periphery of said resilient means including at least one drain groove interconnecting opposite sides of said wall to provide a means for drainage of seepage fluids from within said sealing means.

6. A shaft seal and bearing assembly comprising, a supporting wall provided with a flanged opening, revoluble shaft means mounted on a vertical axis and extending through said opening, said shaft means including a bearing surface lying in a plane intersecting the longitudinal axis of said shaft means defining a depending annulus, sealing means encircling said flange and abutting said depending annulus in a sliding contact to produce a watertight seal between said wall and said bearing surface during rotation of said shaft means, a porous bearing positioned within said opening and journalling said shaft means, a sleeve member retaining said bearing and including a water deflector lip extending above the junction of said depending annulus and said sealing means, and resilient means mounting said sleeve member in said flanged opening and defining an oil reservoir contiguously encircling said bearing, the periphery of said resilient means including at least one drain groove interconnecting opposite sides of said wall to provide a means for drainage of seepage fluids from within said sealing means.

References Cited in the file of this patent

UNITED STATES PATENTS

| | | |
|---|---|---|
| 1,689,912 | Carrey | Oct. 30, 1928 |
| 2,230,472 | Sullivan | Feb. 4, 1941 |
| 2,269,190 | Dunham | Jan. 6, 1942 |